US 6,556,822 B1

(12) United States Patent
Matsumoto

(10) Patent No.: US 6,556,822 B1
(45) Date of Patent: Apr. 29, 2003

(54) DIGITAL CORDLESS TELEPHONE DEVICE WHICH GIVES A WARNING TO PREVENT UNEXPECTED TERMINATION OF COMMUNICATION

(75) Inventor: Hirotsugu Matsumoto, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 08/671,558

(22) Filed: Jun. 27, 1996

(30) Foreign Application Priority Data

Jun. 30, 1995 (JP) .............................. 7-165864

(51) Int. Cl.[7] .............................. H04Q 7/32
(52) U.S. Cl. ...................... 455/421; 455/437; 455/67.1; 455/575
(58) Field of Search ................. 455/421, 422, 455/423, 425, 426, 465, 436, 437, 442, 444, 566, 567, 67.1, 67.3, 67.7, 74.1, 575

(56) References Cited

U.S. PATENT DOCUMENTS

| 5,329,635 A | | 7/1994 | Wadin et al. | |
|---|---|---|---|---|
| 5,375,254 A | * | 12/1994 | Owen | 455/525 |
| 5,392,331 A | * | 2/1995 | Patsiokas et al. | 455/421 |
| 5,406,615 A | * | 4/1995 | Miller et al. | 455/436 |
| 5,426,690 A | * | 6/1995 | Hikuma et al. | 455/421 |

FOREIGN PATENT DOCUMENTS

| EP | 0 693 861 | 7/1995 |
|---|---|---|
| GB | 2 247 811 | 3/1992 |
| JP | 4-25233 | 1/1992 |
| JP | 8-8802 | 1/1996 |

* cited by examiner

Primary Examiner—Lester G. Kincaid
(74) Attorney, Agent, or Firm—Armstrong, Westerman & Hattori, LLP.

(57) ABSTRACT

A digital cordless telephone device for performing radio communication with another telephone device via one of a plurality of base stations and executing a hand-over between a first base station to a second base station based on the RSSI of the first base station. The digital cordless telephone device includes an RSSI detection unit for detecting the RSSI of the first base station, a comparison unit for comparing the RSSI detected by the RSSI detection unit with a predetermined threshold, a connection control unit for trying to execute a hand-over when the RSSI is smaller than the predetermined threshold, a measurement unit for counting the number of continuous hand-over failures, and an information unit for giving a warning to the user of the digital cordless telephone device when the number counted by the measurement unit has reached the predetermined threshold.

18 Claims, 4 Drawing Sheets

DIGITAL CORDLESS TELEPHONE DEVICE WHICH GIVES A WARNING TO PREVENT UNEXPECTED TERMINATION OF COMMUNICATION

BACKGROUND OF THE INVENTION (1) Field of the Invention

The present invention relates to a digital cordless telephone device which gives a warning to prevent its communication with another telephone device from being unexpectedly terminated.

(2) Related Art

Digital cordless telephone devices allow their users to communicate with each other via public base stations which are installed outdoors as well as via private base stations. Such digital cordless telephone devices are standardized under Second Generation Cordless Telephone System RCR STD-28 which has been issued by the Research and Development Center for Radio Systems.

Each base station has its own service area within which users can use digital cordless phones or car phones via the base station. Since users cannot communicate via a base station outside its service area, it is necessary for them to make sure that they are within the service area of a base station to make a telephone call.

Japanese Laid-open Patent Application No. 4-25233 has suggested a digital cordless telephone device which displays a sign to inform the user that the telephone device is not located within the radio zone of a base station. In this technique, a personal station measures a Received-Signal-Strength Indicator (hereinafter RSSI) which is transmitted from the base station, and displays the sign when the measured RSSI is lower than a predetermined level.

The above-mentioned RCR STD-28 defines the hand-over level (Lh) of each base station, and stipulates that each personal station within the service area of a base station should obtain the hand-over level (Lh) of the base station when it starts to connect with a base station or to execute a hand-over.

A hand-over refers to a personal station switching from the current base station to another base station as it moves. To be more specific, a personal station disconnects from the current base station, and searches for other available base stations whose RSSIs are higher than a predetermined threshold by examining the RSSIs of their control channels. Then, the personal station selects the base station that has the highest RSSI among the searched base stations, and executes a hand-over. A hand-over level (Lh) refers to an RSSI level which requires a personal station to execute a hand-over.

FIG. 1 is an illustration to explain how a hand-over is executed with conventional digital cordless telephone devices. The illustration includes base stations 1, 2 and 3, their respective service areas 4, 5, and 6, a mobile personal station 7, and a radio zone 8 of the base station 1. In the radio zone 8, personal stations can receive radio waves from the base station 1.

It is assumed that the mobile personal station 7 is communicating with another personal station via the base station 1, while moving in the direction of the arrow A. The mobile personal station 7 must have obtained the hand-over level (Lh) of the base station 1 when it started the communication. The mobile personal station 7 can continue the communication via the base station 1 as long as it is within the service area 4, which is to say as long as the RSSI of the base station 1 is equal to or higher than the hand-over level (Lh). If the mobile personal station 7 moves across the point P1 on the limit of the service area 4, the RSSI of the base station 1 becomes lower than its hand-over level (Lh). As the result, the mobile personal station 7 executes a hand-over to switch from the base station 1 to the base station 2, thereby continuing the communication.

However, conventional digital cordless telephone devices, such as the mobile personal station 7, have the following problem which will be explained with reference to FIG. 1.

It is assumed that the mobile personal station 7 is communicating with another personal station via the base station 1, while moving in the direction of the arrow B. The RSSI of the base station 1 becomes lower than its hand-over level (Lh) when the mobile personal station 7 goes over point P2. At this point, although the mobile personal station 7 tries to execute a hand-over, there is no base station available. The mobile personal station 7 then tries to re-connect with the base station 1. However, the mobile personal station 7 cannot re-connect with the base station 1 once it gets out of the service area. As a result, the communication is unexpectedly terminated.

To solve this problem, it would be possible for a personal station to give a warning depending on the hand-over level (Lh) of each base station. However, it would cause another problem in that the warning is given even when there is a base station available to execute a hand-over. For example, when the mobile personal station 7 is moving in the direction of the arrow A, a warning would be given when the mobile personal station 7 passes the point Pl, although a hand-over is executed between the base station 1 and the base station 2.

SUMMARY OF THE INVENTION

In view of the foregoing problems, the object of the present invention is to provide a digital cordless telephone device which gives a warning to inform the user that it is located in the vicinity of the service area limit of the base station to which it is connected.

The above object can be achieved by a digital cordless telephone device which performs radio communication with another telephone device via one of a plurality of base stations and executes a hand-over to switch its connection from a first base station to a second base station based on an RSSI of the first base station, including the following: an RSSI detection unit for detecting the RSSI of the first base station; a comparison unit for comparing the RSSI detected by the RSSI detection unit with a predetermined threshold; a connection control unit for trying to execute a hand-over when the RSSI is smaller than the predetermined threshold; a measurement unit for counting a number of continuous hand-over failures; and an information unit for giving a warning to a user of the digital cordless telephone device when the number counted by the measurement unit has reached the predetermined threshold.

In the above-explained construction, when the digital cordless telephone device has failed in hand-overs for a predetermined number of times on end, it gives a warning to inform the user that the digital cordless telephone device is located near the service area limit and that it is highly possible that the communication is terminated. Consequently, the user can stop moving further or move in a different direction, thereby preventing the communication from being terminated.

The above object can be also achieved by another digital cordless telephone device which includes the following: an RSSI detection unit for detecting RSSIs of the plurality of base stations; a comparison unit for comparing an RSSI of the first base station which has been detected by the RSSI detection unit with a predetermined threshold; a search unit for searching for all base stations that can be a target station for re-connection when the RSSI of the first base station is smaller than the predetermined threshold, and for selecting one base station among all the base stations; a measurement unit for counting a number of times the search unit has selected the first base station continuously; and an information unit for giving a warning to a user of the digital cordless telephone device when the number counted by the measurement unit has reached the predetermined threshold.

The connection control unit may include the following: a disconnection unit for disconnecting the digital cordless telephone device from the first base station when the RSSI is smaller than the predetermined threshold; a search unit for searching for the second base station when the disconnection unit has disconnected the cordless telephone device from the first base station; a hand-over unit for executing a hand-over when the search unit has searched for the second base station; a re-connection unit for trying to re-connect the digital cordless telephone device with the first base station, when the second base station does not exist; and a judgement unit for judging a hand-over to have ended in failure when the re-connection unit has successfully re-connected the digital cordless telephone device with the first base station.

The judgement unit may include the following: a first judgement unit for judging whether the re-connection unit has successfully re-connected the digital cordless telephone device with the first base station; and a second judgement unit for judging whether the RSSI of the first base station is smaller than the predetermined threshold when the first judgement unit has judged that the digital cordless telephone device has been successfully re-connected with the first base station. The judgement unit judges a hand-over to have ended in failure when the second judgement unit has judged the RSSI of the first base station to be smaller than the predetermined threshold.

The measurement unit may include the following: a counter for counting a number of hand-over failures which have been judged by the judgement unit. The measurement unit resets the counter when the hand-over unit has successfully executed a hand-over and when the second judgement unit has judged the RSSI of the first base station to be one of being equal to and larger than the predetermined threshold.

The search unit may include the following: a detection unit for detecting RSSIs of the plurality of base stations except the first base station; and a judgement unit for judging a presence or absence of the second base station from the RSSIs detected by the detection unit.

The comparison unit may include a storage unit for storing the predetermined threshold.

The digital cordless telephone device may further include a reception unit for receiving the predetermined threshold from the first base station. The storage unit stores the predetermined threshold received by the reception unit.

The information unit may sound a beep as the warning through a speaker.

The information unit may sound the beep when the number of hand-over failures counted by the measurement unit has become two.

The measurement may include a counter for counting a number of times the search unit has selected the first base station. The measurement unit resets the counter when base stations other than the first base station have been selected.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 2:
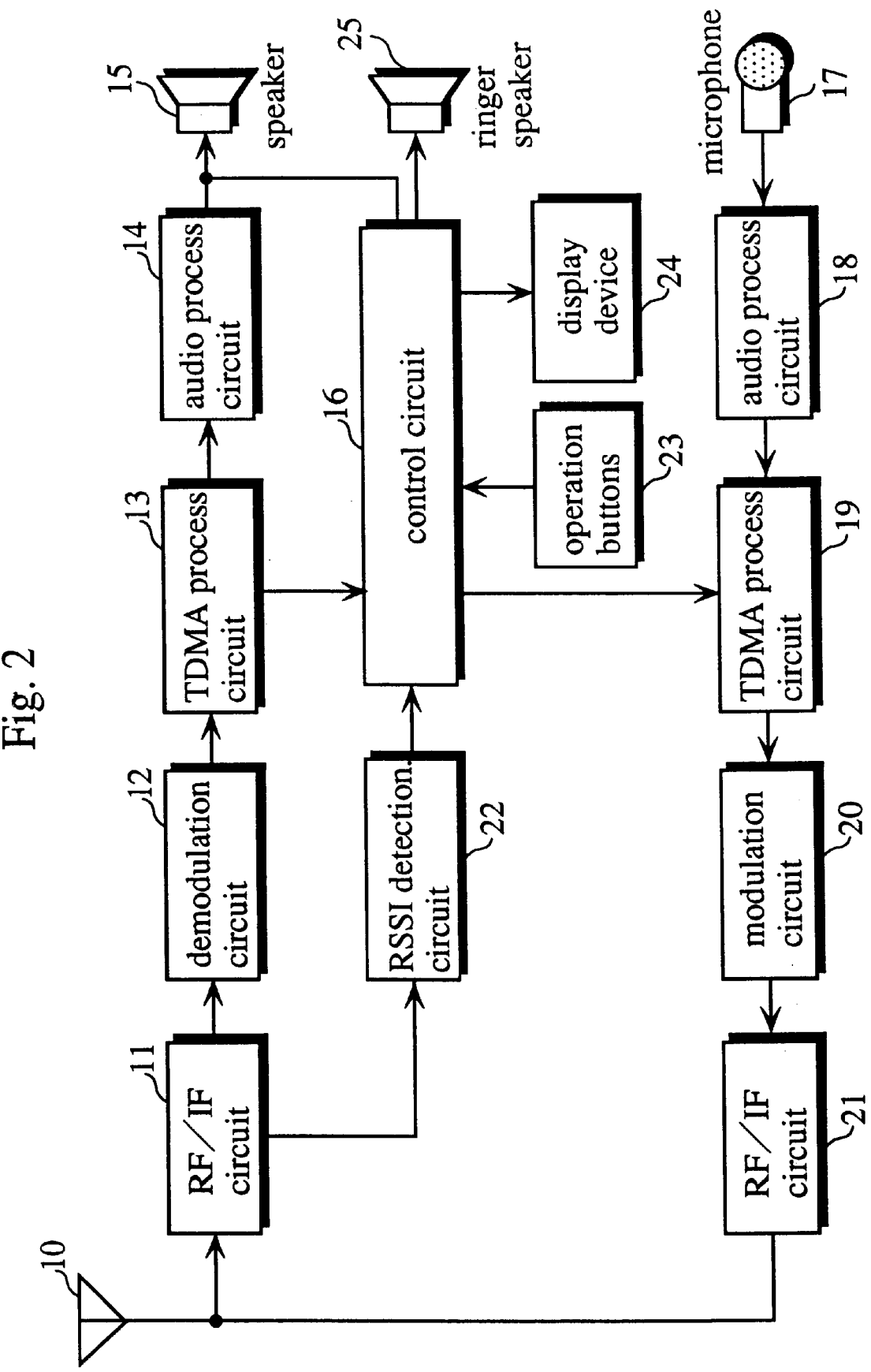
FIG. 2 is a block diagram which shows the construction of the digital cordless telephone device of the present invention.

FIG. 2 is a block diagram which shows the constriction of the digital cordless telephone device of the present invention. The digital cordless telephone device includes an antenna 10, a Radio Frequency/Intermediate Frequency (hereinafter RF/IF) circuit 11, a demodulation circuit 12, a Time Division Multiple Access (hereinafter TDMA) process circuit 13, an audio process circuit 14, a speaker 15, a control circuit 16, a microphone 17, another audio process circuit 18, another TDMA process circuit 19, a modulation circuit 20, another RF/IF circuit 21, an RSSI detection circuit 22, operation buttons 23, a display device 24, and a ringer speaker 25.

The antenna 10 receives radio waves from a base station.

The RF/IF circuit 11 frequency-converts high frequency signals received by the antenna 10.

The demodulation circuit 12 subjects the frequency-converted signals to a $\pi/4$-shift-Quadrature Phase Shift Keying (hereinafter QPSK) demodulation.

The TDMA process circuit 13 subjects the $\pi/4$-shift-QPSK-demodulated signals to a TDMA process.

The audio process circuit 14 converts audio signals included in the TDMA processed signals into analog signals.

The speaker 15 outputs the analog signals as human speech.

The control circuit 16 extracts control signals and messages of a base station from the TDMA process circuit 13, so as to control the entire device.

The microphone 17 receives users speech.

The audio process circuit 18 converts audio signals which have been inputted to the microphone 17 into digital signals.

The TDMA process circuit 19 subjects the digital signals and the control signals which have been outputted from the control circuit 16 to a TDMA process.

The modulation circuit 20 subjects the TDMA processed signals to a $\pi/4$-shift-QPSK modulation.

The RF/IF circuit 21 subjects the $\pi/4$-shift-QPSK-modulated signals to frequency conversion or amplification, and transits them through the antenna 10.

The RSSI detection circuit 22 detects the RSSI from a base station. The control circuit 16 controls the entire device, based on the detected RSSI. The process of the control circuit 16 will be detailed later.

The operation buttons 23 include a ten-key pad and function keys.

The display device 24 displays signs including a warning which informs the user that the digital cordless telephone device is not located within the service area.

Figure 3A:
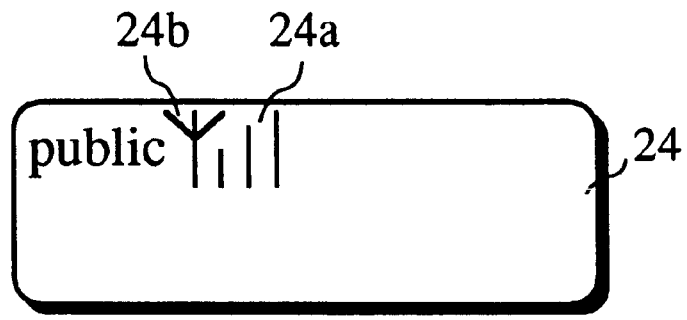
FIGS. 3A–3D show samples of signs which are displayed by the display device 24.
Figure 3B:
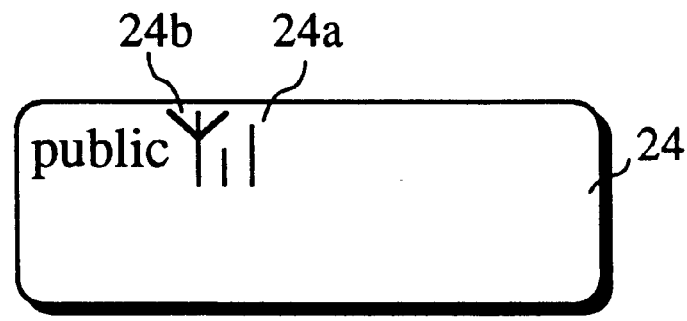
Figure 3C:
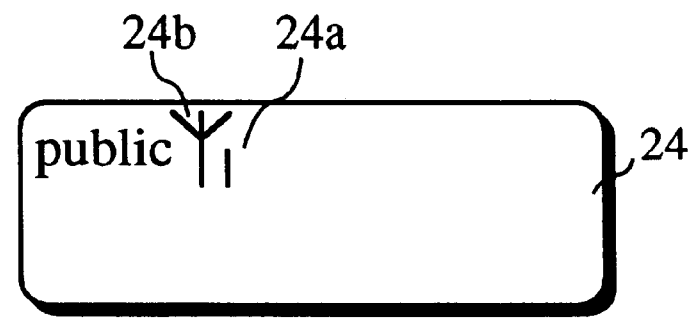
Figure 3D:
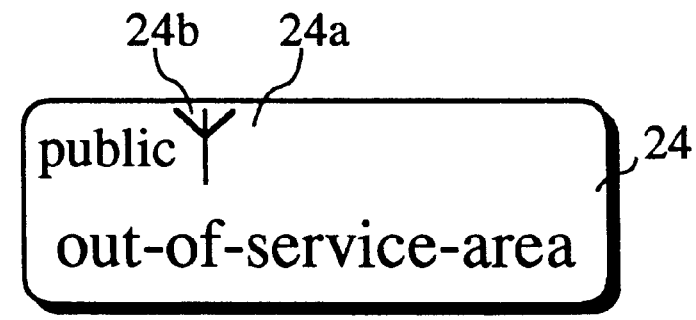

FIGS. 3A–3D show samples of signs which are displayed by the display device 24. The display device 24 displays bars 24a indicating the RSSI which has been detected by the RSSI detection circuit 22, and an antenna symbol 24b. The RSSI is compared with the predetermined level in the control circuit 16. As the RSSI gets lower, the number of bars 24a is decreased as shown in FIGS. 3A–3C. When the RSSI becomes lower than the predetermined level, the bars 24a disappear, the antenna symbol 24b flashes on and off, and an out-of-service-area warning appears to inform the user that the digital cordless telephone device is approaching the limit of the service area of the base station to which it is connected.

Figure 4:
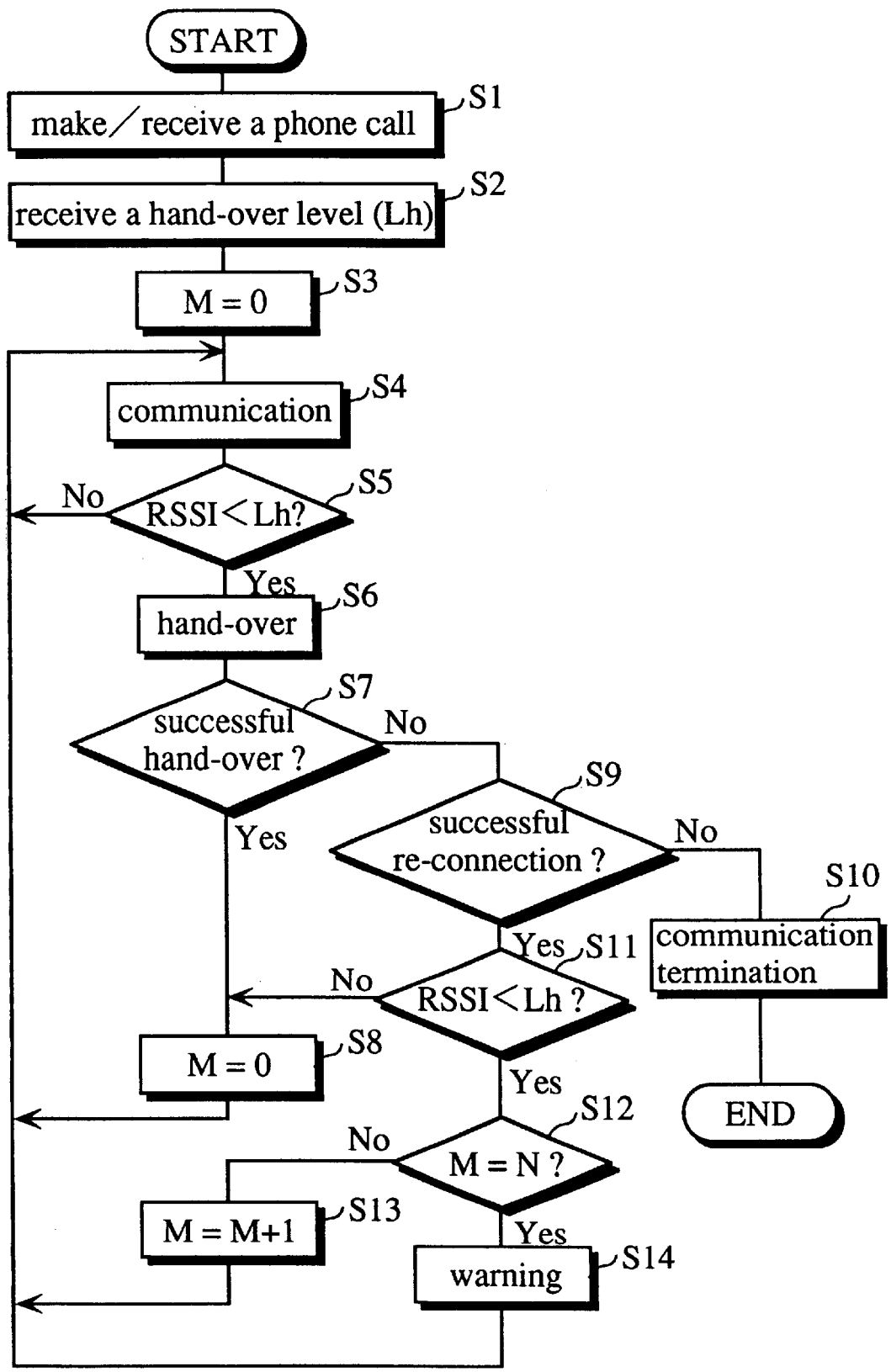
FIG. 4 is a flowchart which depicts the detailed process of the control circuit 16 of the digital cordless telephone device of the present invention.

FIG. 4 is a flowchart which depicts the detailed process of the control circuit 16 of the digital cordless telephone device of the present invention as a personal station. When the user of this personal station makes/receives a telephone call (S1), the personal station receives a hand-over level (Lh) from a base station (S2), and resets a counter M which indicates the number of re-connection (S3), which will be detailed below. After predetermined transmission/reception procedure, the personal station starts to communicate with another personal station (S4). The RSSI detection circuit 22 detects the RSSI of the base station during the communication (S5), and compares it with the hand-over level (Lh) which has been obtained in the step S2. When the RSSI of the base station becomes lower than the hand-over level (Lh) during the communication (S5:Yes), a hand-over is performed (S6). If there is no available base station whose RSSI is higher than the predetermined threshold, the personal station re-connects with the same base station. Although the personal station is not connected with any base station during the re-connection process, the connection between the other personal station and the base station is maintained. Although the personal station is once disconnected from the current base station in the present embodiment, it is possible for a personal station to select a base station for a hand-over by using the control channel only, without the disconnection.

If the hand-over has been successful (S7:Yes), or the personal station has switched from the current base station to another base station, the personal station resets the counter M (S8) and resumes the communication (S4).

If a hand-over has been unsuccessful (S7:No), the cause is checked (S9). An unsuccessful hand-over may be caused when the personal station which has been disconnected from the current base station is either connected with the same base station again, or not connected with any base station including the same base station.

If the personal station has failed in the re-connection with the same base station and cannot connect with another base station (S9:No), the personal station terminates the communication (S10) and ends the process.

On the other hand, if the personal station has successfully re-connected with the same base station, it is determined whether the RSSI is higher than the hand-over level (Lh) or not (S11). When the RSSI is equal to or higher than the hand-over level (Lh) (S11:No), the personal station resets the counter M (S8) and resumes the communication (S4).

On the other hand, when the RSSI is lower than the hand-over level (Lh) (S11:Yes), it is determined whether or not the number of re-connection which is held in the counter M is equal to or larger than a predetermined number N (S12). This predetermined number N is 2 in the present embodiment. When M is smaller than N, "1" is added to M (S13), and the personal station resumes the communication (S4).

Figure 1:
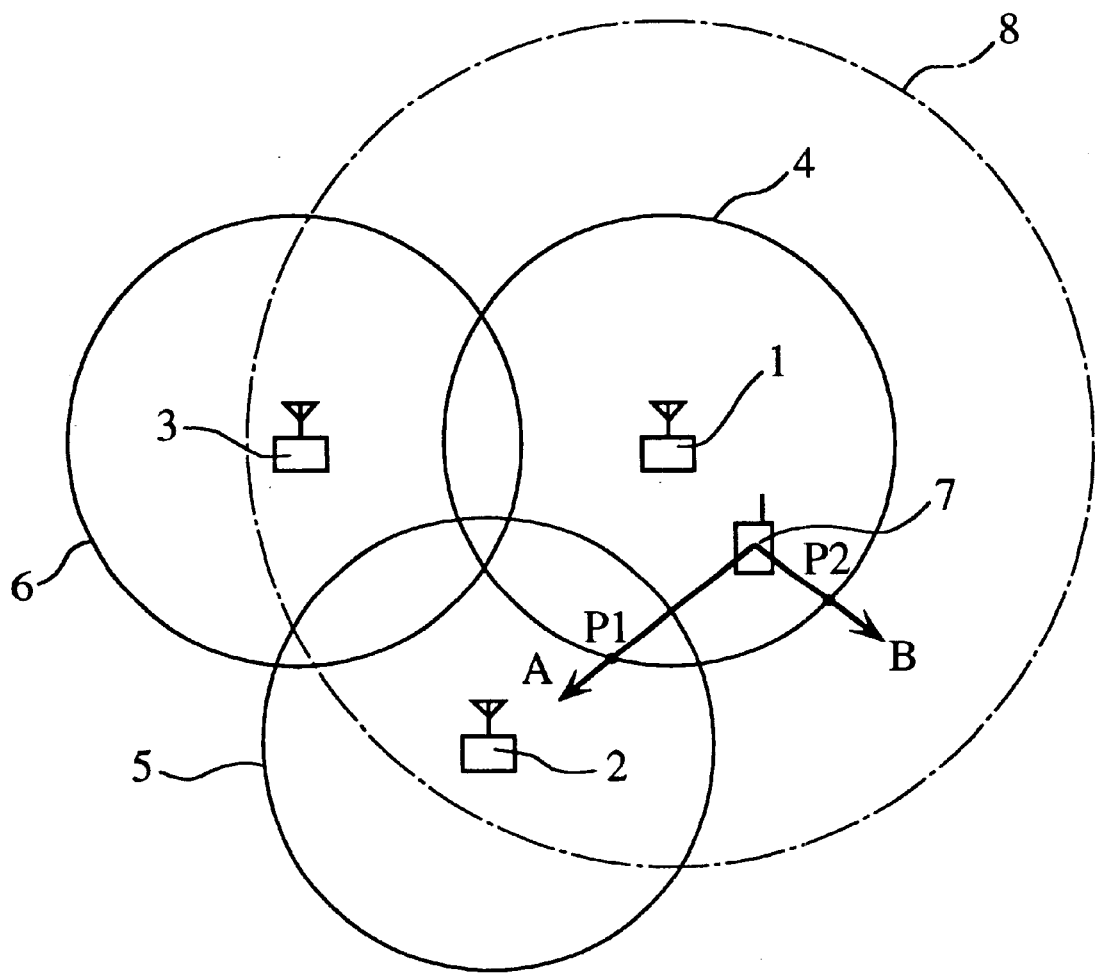
FIG. 1 is an illustration to explain how a hand-over is executed with conventional digital cordless telephone devices.

The number of re-connection may be larger than N if the personal station is located in the vicinity of the service area limit of the base station, with no other base station available for a hand-over, as P2 in FIG. 1. In such a case, it is highly probable that communication is terminated. To avoid this, the display device 24 displays an out-of-service-area warning shown in FIG. 3D and the speaker 15 beeps tones to call users attention (S14).

As explained hereinbefore, the digital cordless telephone device of the present invention gives a warning to guide users not to move any further or to move in another direction when a personal station has failed in a hand-over and re-connected with the same base station, and the RSSI becomes smaller than the hand-over level (Lh) for a predetermined number of times on end.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A digital cordless telephone device which performs radio communication with another telephone device via one of a plurality of base stations and executes a hand-over, the hand-over signifying said digital cordless telephone device switching its connection from a first base station to a second base station based on an RSSI of the first base station, said digital cordless telephone device comprising:

an RSSI detection means for detecting the RSSI of the first base station;

a comparison means for comparing the RSSI detected by said RSSI detection means with a predetermined threshold;

a connection control means for trying to execute a hand-over when the RSSI is smaller than the predetermined threshold;

a measurement means for counting a number of continuous hand-over failures; and an information means for giving a warning to a user of said digital cordless telephone device when the number counted by said measurement means has reached the predetermined threshold.

2. The digital cordless telephone device of claim 1, wherein said connection control means comprises:

a disconnection means for disconnecting said digital cordless telephone device from the first base station when the RSSI is smaller than the predetermined threshold;

a search means for searching for the second base station when said disconnection means has disconnected said cordless telephone device from the first base station;

a hand-over means for executing a hand-over when said search means has searched for the second base station;

a re-connection means for trying to re-connect said digital cordless telephone device with the first base station, when the second base station does not exist; and a judgement means for judging a hand-over to have ended in failure when said re-connection means has successfully re-connected said digital cordless telephone device with the first base station.

3. The digital cordless telephone device of claim 2, wherein said judgement means comprises:

a first judgement unit for judging whether said re-connection means has successfully re-connected said digital cordless telephone device with the first base station; and a second judgement unit for judging whether the RSSI of the first base station is smaller than the predetermined threshold when said first judgement unit has judged that said digital cordless telephone device has been successfully re-connected with the first base station, wherein said judgement means judges a hand-over to have ended in failure when said second judgement unit has judged the RSSI of the first base station to be smaller than the predetermined threshold.

4. The digital cordless telephone device of claim 3, wherein said measurement means comprises:

a counter for counting a number of hand-over failures which have been judged by said judgement means, wherein said measurement means resets said counter when said hand-over means has successfully executed a hand-over and when said second judgement unit has judged the RSSI of the first base station to be one of being equal to and larger than the predetermined threshold.

5. The digital cordless telephone device of claim 2, wherein said search means comprises:

a detection unit for detecting RSSIs of said plurality of base stations except the first base station; and a judgement unit for judging a presence or absence of the second base station from the RSSIs detected by said detection unit.

6. The digital cordless telephone device of claim 1, wherein said comparison means comprises:

a storage unit for storing the predetermined threshold.

7. The digital cordless telephone device of claim 6 further comprising:

a reception means for receiving the predetermined threshold from the first base station, wherein said storage unit stores the predetermined threshold received by said reception means.

8. The digital cordless telephone device of claim 1, wherein said information means sounds a beep as the warning through a speaker.

9. The digital cordless telephone device of claim 1, wherein said information means sounds the beep when the number of hand-over failures counted by said measurement means has become two.

10. A digital cordless telephone device which performs radio communication with another telephone device via one of a plurality of base stations and executes a hand-over, the hand-over signifying said digital cordless telephone device switching its connection from a first base station to a second base station based on an RSSI of the first base station, said digital cordless telephone device comprising:

an RSSI detection means for detecting RSSIs of said plurality of base stations;

a comparison means for comparing an RSSI of the first base station which has been detected by said RSSI detection means with a predetermined threshold;

a search means for searching for all base stations that can be a target station for re-connection when the RSSI of the first base station is smaller than the predetermined threshold, and for selecting one base station among said all base stations;

a measurement means for counting a number of times said search means has selected the first base station continuously; and an information means for giving a warning to a user of said digital cordless telephone device when the number counted by said measurement means has reached the predetermined threshold.

11. The digital cordless telephone device of claim 10, wherein said comparison means comprises:

a storage unit for storing the predetermined threshold.

12. The digital cordless telephone device of claim 11 further comprising:

a reception means for receiving the predetermined threshold from the first base station, wherein said storage unit stores the predetermined threshold received by said reception means.

13. The digital cordless telephone device of claim 10, wherein said measurement means comprises:

a counter for counting a number of times said search means has selected the first base station;

wherein said measurement means resets said counter when base stations other than the first base station have been selected.

14. The digital cordless telephone device of claim 13, wherein said measurement means resets said counter when said search means has selected the first base station and the RSSI of the first base station is one of being equal to and larger than the predetermined threshold.

15. The digital cordless telephone device of claim 10, wherein said one base station that is selected among said all base stations has a highest RSSI among the RSSIs detected by said RSSI detection means.

16. The digital cordless telephone device of claim 15, wherein when said search means selects said one base station, said search means disconnects said digital cordless telephone device from the first base station.

17. The digital cordless telephone device of claim 10, wherein said information means sounds a beep as the warning through a speaker.

18. The digital cordless telephone device of claim 10, wherein said information means sounds the beep when the number of hand-over failures counted by said measurement means has become two.

* * * * *